(12) United States Patent
Tian

(10) Patent No.: US 10,514,595 B2
(45) Date of Patent: *Dec. 24, 2019

(54) DUAL-COLOR LASER LIGHT SOURCE AND LASER PROJECTOR

(71) Applicants: HISENSE CO., LTD., Qingdao (CN); HISENSE USA CORPORATION, Suwanee, GA (US); HISENSE INTERNATIONAL CO., LTD., Qingdao (CN)

(72) Inventor: Youliang Tian, Qingdao (CN)

(73) Assignees: HISENSE CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,725

(22) Filed: Oct. 30, 2018

(65) Prior Publication Data
US 2019/0204723 A1 Jul. 4, 2019
US 2019/0361331 A9 Nov. 28, 2019

Related U.S. Application Data

(62) Division of application No. 15/857,591, filed on Dec. 28, 2017, now Pat. No. 10,139,716.

(30) Foreign Application Priority Data

Aug. 18, 2017 (CN) .......................... 2017 1 0712832
Aug. 18, 2017 (CN) .......................... 2017 1 0712834

(51) Int. Cl.
*G03B 21/20* (2006.01)
*H04N 9/31* (2006.01)
(Continued)

(52) U.S. Cl.
CPC .......... *G03B 21/204* (2013.01); *G02B 6/008* (2013.01); *G02B 27/1006* (2013.01);
(Continued)

(58) Field of Classification Search
CPC .............. G03B 21/204; G03B 21/2013; G03B 21/2033; G03B 21/2066; G03B 21/2073;
(Continued)

(56) References Cited

U.S. PATENT DOCUMENTS 10,139,716 B1* 11/2018 Tian ........................ G02B 6/008
2014/0029237 A1* 1/2014 Mehl ........................ F21V 9/08
362/84

(Continued)

FOREIGN PATENT DOCUMENTS

CM 106200235 A1 12/2016
CN 103376636 A 10/2013
(Continued)

OTHER PUBLICATIONS

The Chinese International Search Report of corresponding international PCT application No. PCT/CN2017/117868, dated May 14, 2018.

(Continued)

*Primary Examiner* — Ryan D Howard
(74) *Attorney, Agent, or Firm* — J.C. Patents

(57) ABSTRACT

The present application discloses a dual-color laser light projection device, wherein the dual-color laser light projection device includes a first blue laser transmitter, a second blue laser transmitter, a red laser transmitter, a light combining component, a fluorescent wheel, a light-pipe; wherein the fluorescent wheel comprises a green fluorescent region provided with a green fluorescent powder and a transmission region, and wherein the green fluorescent region is excited by a first blue laser emitted from the first blue laser trans- (Continued)

mitter to generates green fluorescence. The light path system of the present application is simple and has a small volume.

15 Claims, 9 Drawing Sheets

(51) Int. Cl.
| | |
|---|---|
| G02B 27/18 | (2006.01) |
| G02B 27/10 | (2006.01) |
| G02B 27/48 | (2006.01) |
| G03B 33/08 | (2006.01) |
| F21V 8/00 | (2006.01) |
| G02B 6/42 | (2006.01) |
| G02B 26/00 | (2006.01) |
| G02B 27/14 | (2006.01) |

(52) U.S. Cl.
CPC ............ *G02B 27/18* (2013.01); *G02B 27/48* (2013.01); *G03B 21/208* (2013.01); *G03B 33/08* (2013.01); *H04N 9/3114* (2013.01); *H04N 9/3158* (2013.01); *H04N 9/3161* (2013.01); *H04N 9/3164* (2013.01); *G02B 6/4215* (2013.01); *G02B 26/008* (2013.01); *G02B 27/141* (2013.01)

(58) Field of Classification Search
CPC .. H04N 9/3158; H04N 9/3161; H04N 9/3164; H04N 9/3167
See application file for complete search history.

(56) References Cited

U.S. PATENT DOCUMENTS

| | | |
|---|---|---|
| 2014/0226306 A1 | 8/2014 | Khan et al. |
| 2014/0340649 A1 | 11/2014 | Takahasha |
| 2017/0115500 A1 | 4/2017 | Tian et al. |

FOREIGN PATENT DOCUMENTS

| | | |
|---|---|---|
| CN | 103399453 A | 10/2013 |
| CN | 203745788 U | 7/2014 |
| CN | 105093794 A | 11/2015 |
| CN | 106597785 A | 4/2017 |
| WO | WO2015149877 A1 | 10/2015 |
| WO | WO2016161924 A1 | 10/2016 |

OTHER PUBLICATIONS

The extended European Search Report of corresponding European patent application No. 18150097.6-1022, dated Jul. 20, 2018.

* cited by examiner

DUAL-COLOR LASER LIGHT SOURCE AND LASER PROJECTOR

CROSS-REFERENCE TO RELATED APPLICATIONS

This application is a divisional application of U.S. patent application Ser. No. 15/857,591, filed on Dec. 28, 2017, which claims priority to Chinese Patent Application No. 201710712834.9, filed on Aug. 18, 2017 and entitled "Dual-color laser light source and laser projector", and the Chinese patent application No. 201710712832.X, filed on Aug. 18, 2017 and entitled "Dual-color laser light source and laser projector". The disclosures of the aforementioned applications are hereby incorporated by reference in their entireties.

TECHNICAL FIELD

The present application relates to the field of projection display, and specifically to a dual-color laser light source and a laser projector.

BACKGROUND

Laser light sources are a light source with high brightness and strong directivity and which emits monochromatic beams. Due to its plenty of advantages, the laser light source has been applied ever increasingly in the field of projection display in recent years. In contrast to a conventional monochromatic laser light source, dual-color laser light source may improve color purity, color brightness and color gamut of the light source and better satisfy the demand for colors in laser projection.

SUMMARY

Embodiments of the present application provide a dual-color laser light source and a laser projector. The technical solutions are as follows:

In a first aspect, the present application provides a dual-color laser light projection device, wherein the dual-color laser light projection device includes a first blue laser transmitter, a second blue laser transmitter, a red laser transmitter, a light combining component, a fluorescent wheel, a light-pipe; wherein the fluorescent wheel comprises a green fluorescent region provided with a green fluorescent powder and a transmission region, and wherein the green fluorescent region is excited by a first blue laser emitted from the first blue laser transmitter to generates green fluorescence;

the light combining component is disposed on a light path between the first blue laser transmitter and the fluorescent wheel, a light path between the light-pipe and the second blue laser transmitter and a light path between the light-pipe and the red laser transmitter;

the light combining component is configured to receive the first blue laser, and to emit the first blue laser to the fluorescent wheel;

the light combining component is also configured to receive the green fluorescence, a second blue laser emitted by the second blue laser transmitter and a red laser emitted by the red laser transmitter, and to emit the green fluorescence, the second blue laser and the red laser to the light-pipe.

Regarding the dual-color laser light projection device provided by the embodiments of the present application, the dual-color laser light projection device has a relatively simple light path system.

DESCRIPTION OF EMBODIMENTS

In order to make the purpose, technical solutions and advantages of the present application clearer, implementations of the present application will be further detailed in conjunction with the figures as below.

A laser light source is a light source with high brightness and strong directivity which emits monochromatic coherent beams, and has been increasingly applied into the field of projection and display due to its numerous advantages.

Figure 1:
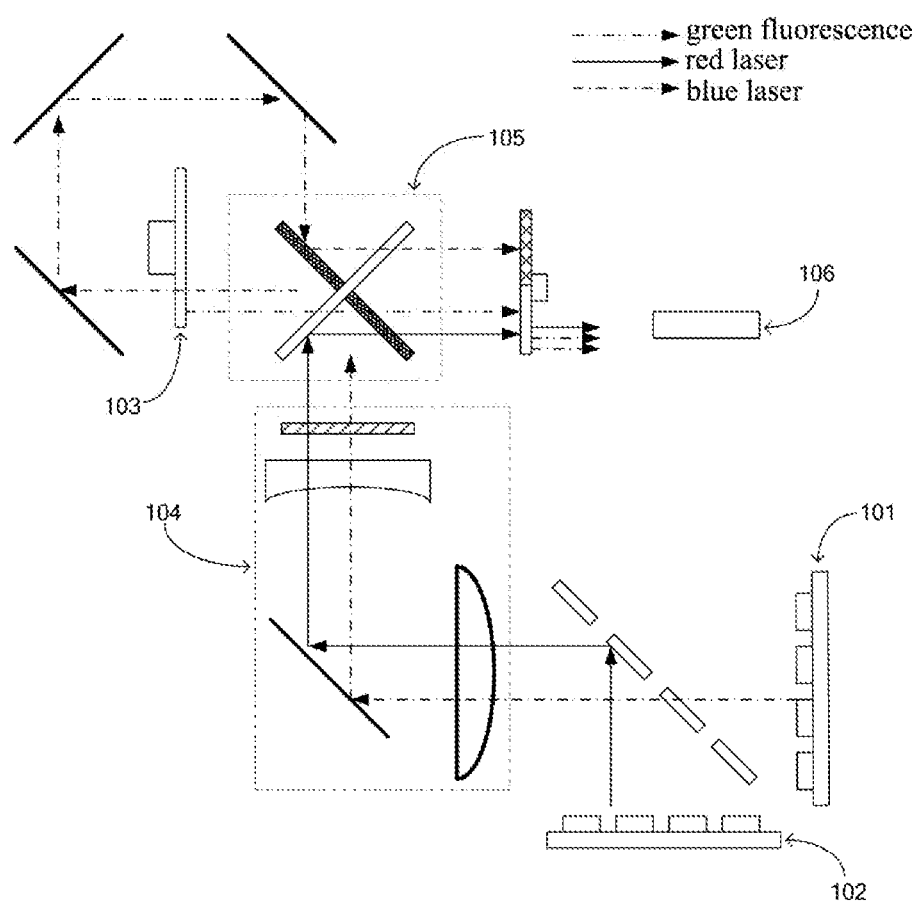
FIG. 1 is a structural diagram for a dual-color laser light source in relevant technology.

In relevant technology, as shown in FIG. 1, the dual-color laser light source generally includes a blue laser transmitter 101, a red laser transmitter 102, a fluorescent wheel 103, a light beam shaping device 104, a light combining component 105 and a light collecting component 106. The principle of emergent light of the dual-color laser light source includes: the blue laser emitted by the blue laser transmitter 101 passes through the light beam shaping device 104, is reflected by the light combining component 105 onto the fluorescent wheel 103, transmits through the fluorescent wheel 103 and passes through a relay loop light path before arriving at the light combining component 105 once again, so as to be reflected and outputted by the light combining component 105; the blue laser irradiates the fluorescent wheel 103, and may excite the fluorescent wheel 103 to emit green fluorescence which is transmitted and outputted by the light combining component 105; red laser emitted by the red laser transmitter 102 passes through the light beam shaping device 104, and is reflected and outputted by the light combining component 105; and lighting function of the laser light source is realized upon three lights with different colors enter into the light collecting component.

In some implementations, the laser light source may be used to a laser projector which may emit light of at least one color to realize display of images. Primary colors refer to "basic colors" which are not obtained by blending other colors. Primary colors blended at different ratios may generate other new colors. The laser projector generally generates light of primary colors to display patterns. Generally, the colors generated by a laser projector are three primary ones, i.e., red, green and blue, and with the development of science and technology, a laser projector may also generate two primary colors and a secondary color, or a combination of a primary color and other secondary colors, on which the embodiments of the present application will not make restrictions.

A laser projector may have various laser light sources, which may include: at least one laser transmitter, wherein the laser light source is able to emit light of at least one color. Generally, the laser light source may also include: a fluorescent wheel (also referred to as a fluorescence color wheel), which may serve as a wavelength transformation device. The laser light source may be a monochromatic laser light source (i.e., include one kind of laser transmitter which generates one color), and may also be a dual-color laser light source (i.e., include two kind of laser transmitters which each generate one color), so as to emit laser of one or two colors. The fluorescent wheel is provided with fluorescent powder which may be excited to generate fluorescence of corresponding colors, which jointly forms three primary colors along with the color of the laser emitted by the laser transmitter, thus acting as a projection light source for providing lighting to optical parts. The light source parts of the laser projector include at least a laser transmitter and a fluorescent wheel. The optical parts of the laser projector include at least an imaging element and a projection lens, wherein the imaging element can be a DMD element or a LCOS element.

In comparison with a monochromatic laser light source, the dual-color laser light source may improve color purity, color brightness and color gamut of a light source, and better satisfy the demand for colors in laser projection.

Figure 2A:
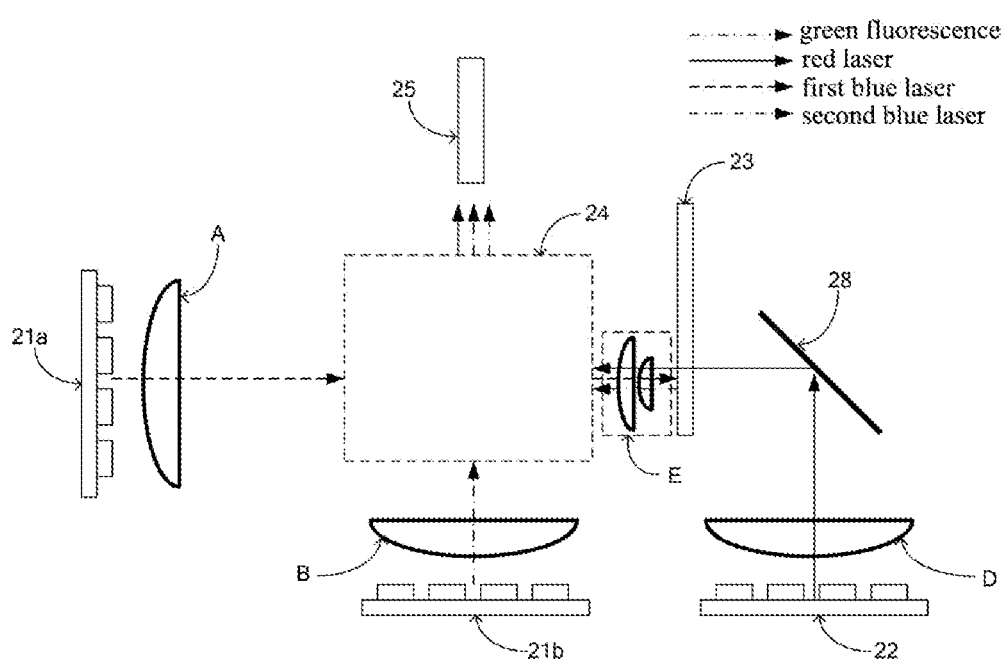
FIG. 2A is a structural diagram for a dual-color laser light source provided by an embodiment of the present application.

The embodiments of the present application provide a dual-color laser light source, as shown in FIG. 2A, the laser light source includes a first blue laser transmitter 21a, a second blue laser transmitter 21b, a red laser transmitter 22, a fluorescent wheel 23, a light collecting component 25 and a light combining component 24, wherein the fluorescent wheel 23 is provided with a green fluorescent region and a transmission region.

The light combining component 24 is arranged between the first blue laser transmitter 21a and the fluorescent wheel 23. The fluorescent wheel 23 is arranged between the light combining component 24 and the red laser transmitter 22. The light collecting component 25 and the second blue laser transmitter 21b are respectively arranged on both sides of the light combining component 25, the connection line between the first blue laser transmitter 21a and the fluorescent wheel 23 is perpendicular to the connection line between the light collecting component 25 and the second blue laser transmitter 21b.

The light combining component 24 is used to transmit first blue laser emitted by the first blue laser transmitter 21a to the fluorescent wheel 23, and to reflect green fluorescence onto the light collecting component 25 after receiving the green fluorescence generated by the first blue laser irradiating the green fluorescent region.

The light combining component 24 is also used to receive second blue laser emitted by the second blue laser transmitter 21b, and to transmit the second blue laser to the light collecting component 25.

The light combining component 24 is also used to receive red laser which is emitted by the red laser transmitter 22 and which transmits through the transmission region, and to reflect the red laser onto the light collecting component 25.

As shown in FIG. 2A, the first blue laser transmitter 21a, the second blue laser transmitter 21b, the light combining component 24 and the light collecting component 25 are arranged on a first side of the fluorescent wheel 23. The red laser transmitter 22 is arranged on a second side of the fluorescent wheel 23. The light combining component 24 is arranged between the first blue laser transmitter 21a and the fluorescent wheel 23, and the light combining component 24 is arranged between the second blue laser transmitter 21b and the light collecting component 25.

It is noted that the laser transmitter provided by the embodiment of the present application may be a laser transmitter array or a separate laser transmitter, and the connection line between the first blue laser transmitter 21a and the fluorescent wheel 23 is perpendicular to the connection line between the light collecting component 25 and the second blue laser transmitter 21b. The two connection lines are not necessarily absolutely perpendicular to each other, and the included angle therebetween may somewhat deviate from a right angle, as long as satisfying that the light from the laser transmitter and the fluorescent wheel can enter the light collecting component 25.

Figure 2B:
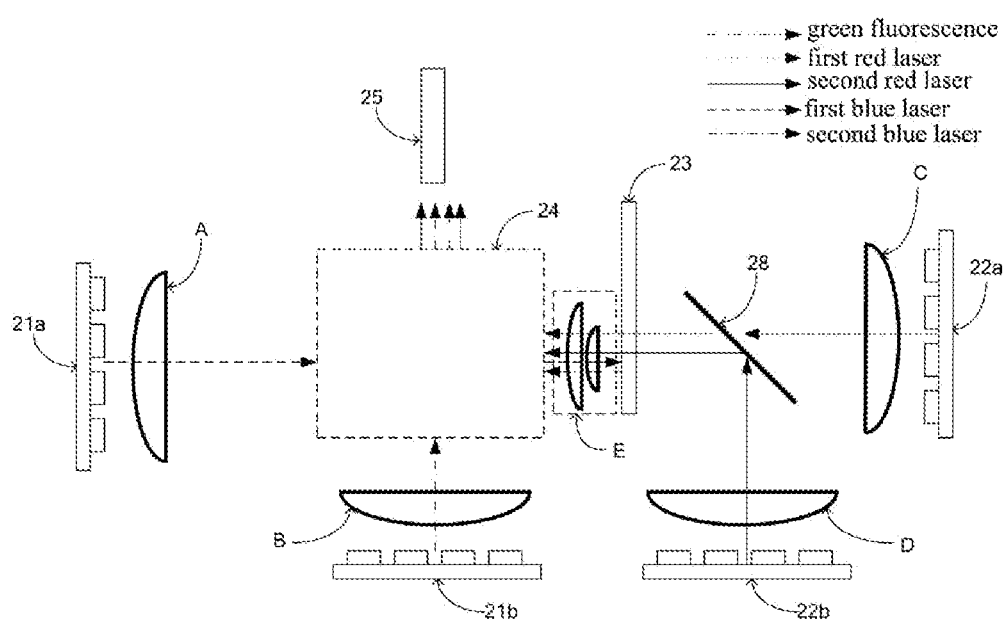
FIG. 2B is a structural diagram for another dual-color laser light source provided by an embodiment of the present application.

In some implementations, as shown in FIG. 2B, the red laser transmitter 22 includes: a first red laser transmitter 22a and a second red laser transmitter 22b. The red laser includes: a first red laser and a second red laser.

The light combining component 24 is also used to respectively reflect the first red laser and the second red laser which are emitted by the first red laser transmitter 22a and the second red laser transmitter 22b and which transmit through the transmission region onto the light collecting component 25.

a polarization direction of the first red laser is perpendicular to a polarization direction of the second red laser.

In some implementations, the first red laser transmitter 22a and the second red laser transmitter 22b may be arranged in parallel on a second side of the fluorescent wheel, and the light is reflected by the reflection device onto the fluorescent wheel 23; alternatively, the first red laser transmitter 22a and the second red laser transmitter 22b may be arranged in parallel at a position opposite the first blue laser transmitter 21a, for directly emitting the first red laser and the second red laser to the fluorescent wheel 23; alternatively, as shown in FIG. 2B, the laser light source also includes a dichroic sheet 28 which is used to reflect the second red laser and to transmit the first red laser.

In some implementations, as shown in FIG. 2A, the dual-color laser light source may also include multiple light beam shaping devices and reflection devices 28, alternatively, as shown in FIG. 2B, the dual-color laser light source may also include multiple light beam shaping devices and dichroic sheets 28. The multiple light beam shaping devices include a first light beam shaping device A, a second light beam shaping device B, a third light beam shaping device C, a fourth light beam shaping device D and a fifth light beam shaping device E.

The first light beam shaping device A, the second light beam shaping device B, the third light beam shaping device C and the fourth light beam shaping device D may be a telescopic system (in practical application, the telescopic system may include a convex lens and a concave lens), and is used to condense the parallel laser emitted by the laser transmitter, so as to reduce the area of the light beam, and the condensed laser is still parallel laser, which may improve transmittance of the parallel laser in back end optical devices.

The fifth light beam shaping device E may be composed of two lenses. The first blue laser is focused by the two lens to irradiate the fluorescent wheel, and the green fluorescence emitted by the fluorescent wheel and the red laser emitted by the red laser transmitter may be performed collimation by the two lens before entering the light combining component, improving uniformity of the emergent light.

The fifth light beam shaping device E may also be composed of one, three or four lenses. And the embodiments of the present application make no limitations on the number of the lenses composing the fifth light beam shaping device E.

In the embodiments of the present application, a light path emission process of the provided dual-color laser light source includes: after passing through the first light beam shaping device A, the first blue laser, transmits through the light combining component 24 and after passing through the fifth light beam shaping device E, irradiates onto the fluorescent wheel 23 for exciting the green fluorescent powder to emit green fluorescence; the green fluorescence passes through the fifth light beam shaping device E before being reflected by the light combining component 24 onto the light collecting component 25; the second blue laser passes through the second light beam shaping device B, before transmitting through the light combining component 24 to be outputted to the light collecting component 25; the red laser emitted by the red laser transmitter 22 passes through fourth light beam shaping device D, and is then reflected by the reflection device 28 onto the fluorescent wheel 23, after transmitting through the fluorescent wheel 23, the red laser passes through the fifth light beam shaping device E and is reflected by the light combining component 24 to be outputted to the light collecting component 25. Three lights with different colors enter the light collecting component 25 and after that may blend into white light, realizing the displaying function of the dual-color laser light source.

The reflection device 28 may be a reflection sheet which may be positioned to form an included angle of 45° with the red laser transmitter, so that after being reflected by the reflection sheet, the red laser emitted by a horizontally positioned red laser transmitter may enter the fluorescent wheel in a perpendicular way, enabling the red laser to be emitted in a preset light path, thus guaranteeing stability in laser emission.

In some implementations, the reflection device 28 may be a second dichroic sheet, for reflecting the red laser onto the fluorescent wheel 23.

In some implementations, in other embodiments, the red laser transmitter 22 may be arranged, opposite to the first blue laser transmitter 21a. The both side of the fluorescent wheel 23, and the red laser emitted by the red laser transmitter 22 is directly emitted to the fluorescent wheel 23, without being emitted via the reflection device.

In some implementations, the light collecting component may be a light-pipe.

In summary, in the dual-color laser light source provided by the embodiments of the present application, the laser light source includes a first blue laser transmitter, a second blue laser transmitter, a red laser transmitter, a fluorescent wheel, a light collecting component and a light combining component, wherein the fluorescent wheel is provided with a green fluorescent region and a transmission region; the light combining component is arranged between the first blue laser transmitter and the fluorescent wheel. The fluorescent wheel is arranged between the light combining component and the red laser transmitter. The light collecting component and the second blue laser transmitter are respectively arranged on both sides of the light combining component. The connection line between the first blue laser transmitter and the fluorescent wheel is perpendicular to the connection line between the light collecting component and the second blue laser transmitter. The first blue laser emitted by the first blue laser transmitter is able to transmit through the light combining component and to excite the green fluorescent region of the fluorescent wheel to emit green fluorescence, then the light combining component reflects the green fluorescence onto the light collecting component. The second blue laser emitted by the second blue laser transmitter transmits through the light combining component to the light collecting component, and red laser emitted by the red laser transmitter transmits through the transmission region of the fluorescent wheel before being reflected by the light combining component onto the light collecting component. The dual-color laser light source has a relatively simple light path system.

In some implementations, the first red laser is p polarized light, the second red laser is s polarized light, the first blue laser is p polarized light, and the second blue laser is s polarized light;

Alternatively, the first red laser is s polarized light, the second red laser is p polarized light, the first blue laser is s polarized light, and second blue laser is p polarized light.

In the above implementations, the red laser collected by the light combining component is converted light of first red laser and second red laser with polarization direction perpendicular to each other, overlay of the two polarized light is able to form overlay of phase patterns during image projection, so as to generate more independent random phase patterns, efficiently reducing speckle effects of the red laser while improving the optical quality of the dual-color laser light source.

In the embodiments of the present application, the first blue laser transmitter, the second blue laser transmitter and the red laser transmitter are each turned on in sequence. In some implementations, the first blue laser transmitter, the second blue laser transmitter and the red laser transmitter are turned on at different moments. In some implementations, if the red laser transmitter includes the first red laser transmitter and the second red laser transmitter, the first red laser transmitter and the second red laser transmitter are turned on in sequence, or the first red laser transmitter and the second red laser transmitter are turned on at the same moment. When the first red laser transmitter and the second red laser transmitter are turned on in sequence, it is required that the outputted first red laser and second red laser are emitted to the transmission region of the fluorescent wheel.

Figure 3A:
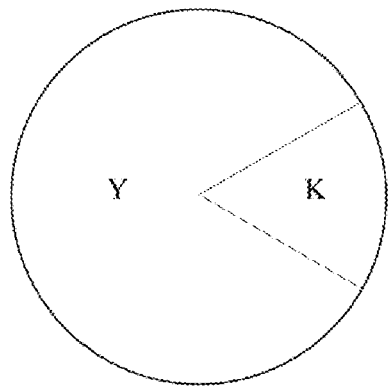
FIG. 3A is a diagram for a fluorescent wheel provided by an embodiment of the present application.

In some implementations, as shown in FIG. 3A, the fluorescent wheel may include a green fluorescent region Y and a transmission region K, the surface of the green fluorescent region Y is provided with green fluorescent powder, and the surface of the transmission region Y is provided with a first diffuser. The green fluorescent region and the transmission region are both in a fan-shaped arrangement, and during rotation, the fluorescent wheel is able to emit green fluorescence and to transmit red laser in sequence.

The first diffuser may is a micron-level particle.

In same applications, the fluorescent wheel may rotate at a preset rotation speed, and when the first blue laser transmitter is turned on, the green fluorescent region of the fluorescent wheel is aligned with the fifth light beam shaping device E (the green fluorescent region is an irradiated region of the first blue laser), and both the second blue laser transmitter and the red laser transmitter are not turned on. When the red laser transmitter is turned on, the transmission region of the fluorescent wheel is aligned with the fifth light beam shaping device E (the transmission region is an irradiated region of the laser), and both the first blue laser transmitter and the second blue laser transmitter are not turned on. When the second blue laser transmitter is turned on, both the first blue laser transmitter and the red laser transmitter are not turned on.

Figure 3B:
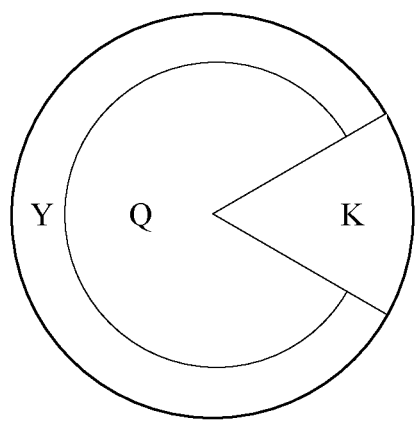
FIG. 3B is a diagram for another fluorescent wheel provided by an embodiment of the present application.

Since the central area of the fluorescent wheel is unable to be aligned with the fifth light beam shaping device, i.e., the central area of the fluorescent wheel is unable to serve as an irradiated region of the laser at any moment, hence as shown in FIG. 3B, the fluorescent wheel may also include a blank area Q which is positioned in the central area of the fluorescent wheel, and the green fluorescent region Y is positioned on the periphery of the blank area Q. The green fluorescent region Y is in a fan-shaped circular arrangement, and the transmission region K is in a fan-shaped or a fan-shaped circular arrangement.

Figure 4:
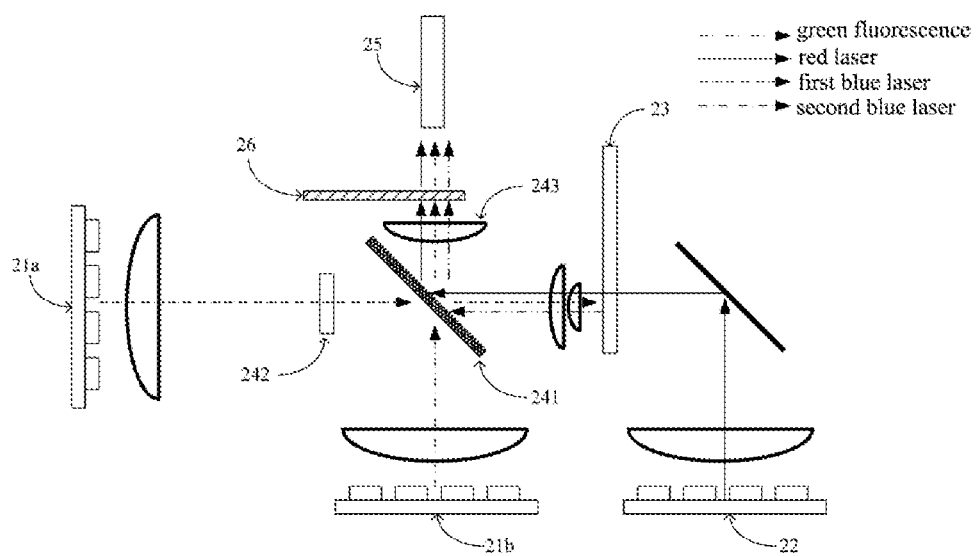
FIG. 4 is a structural diagram for another dual-color laser light source provided by an embodiment of the present application.

As shown in FIG. 4, the light combining component may include: a first dichroic sheet 241 which is arranged on a light incident side of the light collecting component 25. The first dichroic sheet 241 is used to transmit the first blue laser and the second blue laser, and to reflect the green fluorescence and to reflect the red laser emitted by the red laser transmitter 22.

In some implementations, as shown in FIG. 4, the laser light source may also include a fixed diffusion sheet 242 for homogenizing first blue laser. Because the first blue laser is excited light of the fluorescent wheel, if the beam is not homogenized, then the laser with light spots of uneven intensity distribution and thus concentrated energy will directly enter the surface of the fluorescent wheel, and the laser light spots with concentrated energy are likely to burn the surface of the fluorescent wheel and to damage the fluorescent wheel, leading to that the laser is unable to normally excite the fluorescent wheel to emit fluorescence.

Figure 5:
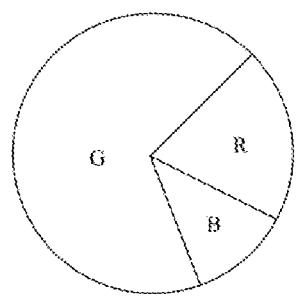
FIG. 5 is a diagram for a color filter wheel provided by an embodiment of the present application.

In some implementations, as shown in FIG. 4, the laser light source may also include: a color filter wheel 26 which is arranged between the first dichroic sheet 241 (the light combining component) and a light incident side of the light collecting component 25. As shown in FIG. 5, the color filter wheel may include a red light filter region R, a blue light filter region B and a green light filter region G. During rotation, the color filter wheel is able to sequentially transmit the second blue laser, the red laser and the green fluorescence.

In some implementations, when the color filter wheel is rotated, and the irradiated region of the color filter wheel is a blue light filter region, the second blue laser transmitter is turned on, while the first blue laser transmitter and the red laser transmitter are not turned on. When the irradiated region of the color filter wheel is a red light filter region, the red laser transmitter is turned on while both the first blue laser transmitter and the second blue laser transmitter are not turned on. When the irradiated region of the color filter wheel is a green light filter region, the first blue laser transmitter is turned on while the second blue laser transmitter and the red laser transmitter are not turned on, so as to sequentially transmit the second blue laser, the red laser and the green fluorescence.

In some implementations, as shown in FIG. 4, the laser light source may also include a focusing lens 243 which is arranged between the first dichroic sheet 241 and the color filter wheel 26. Due to the fact that when the divergence angle of the light beam transmitted through the first dichroic sheet or reflected by the first dichroic sheet is greater than the collection angle of the light collecting component, the result is reduced light collection efficiency, impacting the brightness of the projection light source. The focusing lens may be used to focus the second blue laser transmitted through the first dichroic sheet and the green fluorescence reflected by the first dichroic sheet and the red laser reflected by the first dichroic sheet respectively, so as to improve the light collection efficiency by the light collecting component, thereby improving the brightness of the projection light source.

In some implementations, in the color filter wheel provided by the embodiment of the present application, the surface of the red light filter region is provided with a second diffuser, the surface of the blue light filter region is provided with a third diffuser. The second diffuser and the third diffuser may be micron-level particles, particle diameter of the third diffuser may be the same with particle diameter of the second diffuser, wherein, the particle diameter of the second diffuser is different from particle diameter of the first diffuser arranged on the surface of the transmission region of the fluorescent wheel.

Strong coherence of the laser inevitably results in speckle effects. The so-called speckles refer to the phenomenon that, when a coherent light source irradiates a rough object, the diverged light, with equal wavelength and a constant phase, creates interference in space, where partly being constructive interference and partly being destructive interference, finally occurring granulate light and dark spots on a screen, i.e., some unfocused smudging, which is likely to develop a sense of dizziness after long-time watching, which inevitably brings quality deterioration of projected images, reducing the viewing experience of users. In contrast to blue laser, red laser has a longer coherence length and higher coherence, and thus has a more severe speckle phenomenon.

In the embodiments of the present application, when passing the fluorescent wheel, the red laser emitted by the red laser transmitter is firstly subjected to a first diffusion by a first diffuser on the transmission region of the fluorescent wheel, and after reflecting by the light combining component, when subjected to a second diffusion by a second diffuser on the red light filter region of the color filter wheel. Because the particle diameter of the first diffuser is different from the particle diameter of the second diffuser, thus diffusion angles for the red laser is different, which may cause the red laser to generate more independent random phase patterns; In some implementations, because both the fluorescent wheel and the color filter wheel rotate, the moving diffuser may further increases the random phases, and is better able to destroy coherence of the red laser, allowing a laser light source for projection to be able to form more independent random phase patterns in a projected image. And the more the number of the independent random phase patterns, the weaker the phenomenon of the light and dark spots, under an integral function of human eye, so as to efficiently reduce the speckle effects of the red laser, and to improve optical quality of a dual-color laser light source.

In some implementations, the particle diameter of the first diffuser may be greater than the particle diameter of the second diffuser, for example, the particle diameter of the first diffuser is 100 microns, and the particle diameters of the second diffuser and the particle diameters of the third diffuser are 30 microns. Firstly the first diffuser may scatter the red laser, then the second diffuser rearranges the phase of the red laser accurately.

It is noted that the particle diameter of the first diffuser may also be smaller than that of the second diffuser, for example, the particle diameter of the first diffuser is 30 microns, and those of the second diffuser and the third diffuser are 100 microns.

In addition, the third diffuser on the blue light filter region of the color filter wheel is used for homogenizing second blue laser, fulfilling the role of removing speckles of the blue laser; and the green light filter region on the color filter wheel is used to filter the green fluorescence, allowing the green light entering the light collecting component to be purer.

In the above implementations, the arrangements of the first diffuser on the surface of the transmission region of the fluorescent wheel, and the arrangements of the second diffuser on the surface of the red light diffusion region of the color filter wheel, realize twice diffusion of the red laser with high coherence while delivering a preferable speckle removal effect for the red laser, thus improving optical quality of the dual-color laser light source.

Figure 6:
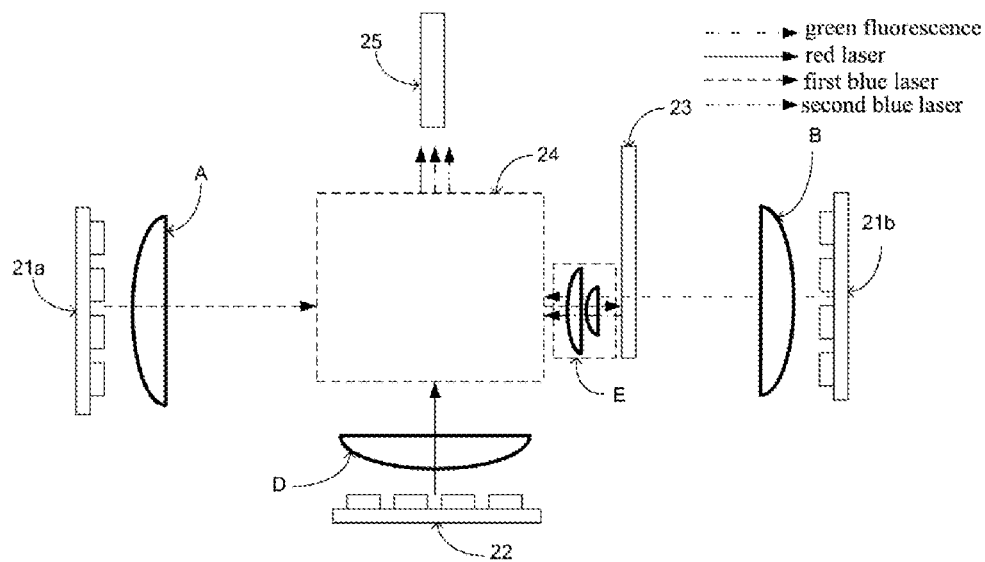
FIG. 6 is a structural diagram for yet another dual-color laser light source provided by an embodiment of the present application.

Some embodiments of the present application provides a dual-color laser light source, as shown in FIG. 6, the laser light source at least includes:

a first blue laser transmitter 21a, a second blue laser transmitter 21b, a red laser transmitter 22, a fluorescent wheel 23, a light collecting component 25 and a light combining component 24, the fluorescent wheel 23 is provided with a green fluorescent region and a transmission region;

the light combining component 24 is arranged between the first blue laser transmitter 21a and the fluorescent wheel 23, the fluorescent wheel 23 is arranged between the light combining component 24 and the second blue laser transmitter 21b, the light collecting component 25 and the red laser transmitter 22 are respectively arranged on both sides of the light combining component 24. A connection line between the first blue laser transmitter 21a and the fluorescent wheel 23 is perpendicular to a connection line between the light collecting component 25 and the red laser transmitter 22.

The light combining component 24 is used to transmit first blue laser emitted by the first blue laser transmitter 21a to the fluorescent wheel 23, and to reflect green fluorescence onto the light collecting component 25 after receiving the green fluorescence generated by the first blue laser irradiating the green fluorescent region.

The light combining component 24 is also used to receive red laser emitted by the red laser transmitter 22 and to transmit the red laser to the light collecting component 25.

The light combining component 24 is also used to receive second blue laser which is emitted by the second blue laser transmitter 21b and transmitted through the transmission region, and to reflect the second blue laser onto the light collecting component 25.

A polarization direction of the second blue laser is perpendicular to a polarization direction of the first blue laser.

In some implementations, the light path emission process of the dual-color laser light source provided by the embodiment of the present application includes: after transmitting through the light combining component 24, the first blue laser irradiates the fluorescent wheel 23, exciting the green fluorescent region of the fluorescent wheel to emit green fluorescence, wherein the green fluorescence is reflected by the light combining component 24 to be outputted to the light collecting component 25. The second blue laser transmits through the fluorescent wheel 23 onto the light combining component 24, and is then reflected by the light combining component 24 to be outputted to the light collecting component 25. The red laser emitted by the red laser transmitter 22 transmits through the light combining component 24 to be outputted to the light collecting component 25. The three lights with different colors enter the light collecting component 25 and may be blended to form white light, so as to realize a lighting function of the dual-color laser light source or display a picture.

Figure 7A:
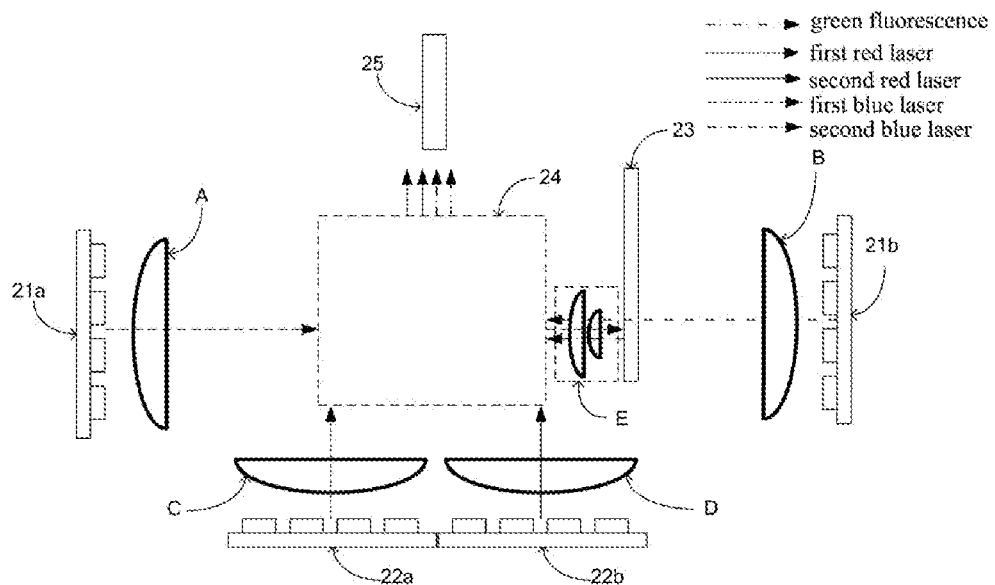
FIG. 7A is a structural diagram for yet another dual-color laser light source provided by an embodiment of the present application.

In some implementations, as shown in FIG. 7A, the red laser transmitter includes: a first red laser transmitter 22a and a second red laser transmitter 22b. The red laser includes first red laser and second red laser. The first red laser transmitter and the second red laser transmitter are arranged in parallel, and both are arranged on another side of the light combining component 24 relative to the light collecting component 25.

The light combining component 24 is also used to respectively receive first red laser emitted by the first red laser transmitter 22a and second red laser emitted by the second red laser transmitter 22b, and to transmit the first red laser and the second red laser to the light collecting component 25.

A polarization direction of the first red laser is perpendicular to a polarization direction of the second red laser.

Since the red laser collected by the light combining component is converted light of first red laser and second red laser with the polarization directions perpendicular to each other, overlay of the two polarized light is able to form overlay of phase patterns during image projection, so as to generate more independent random phase patterns, efficiently reducing speckle effects of the red laser while improving the optical quality of the dual-color laser light source.

In some implementations, the first blue laser transmitter, the second blue laser transmitter and the red laser transmitter are each turned on in sequence. In some implementations, the first red laser transmitter and the second red laser transmitter of the red laser transmitter are turned on at the same moment, or the first red laser transmitter and the second red laser transmitter are turned on in sequence.

Figure 7B:
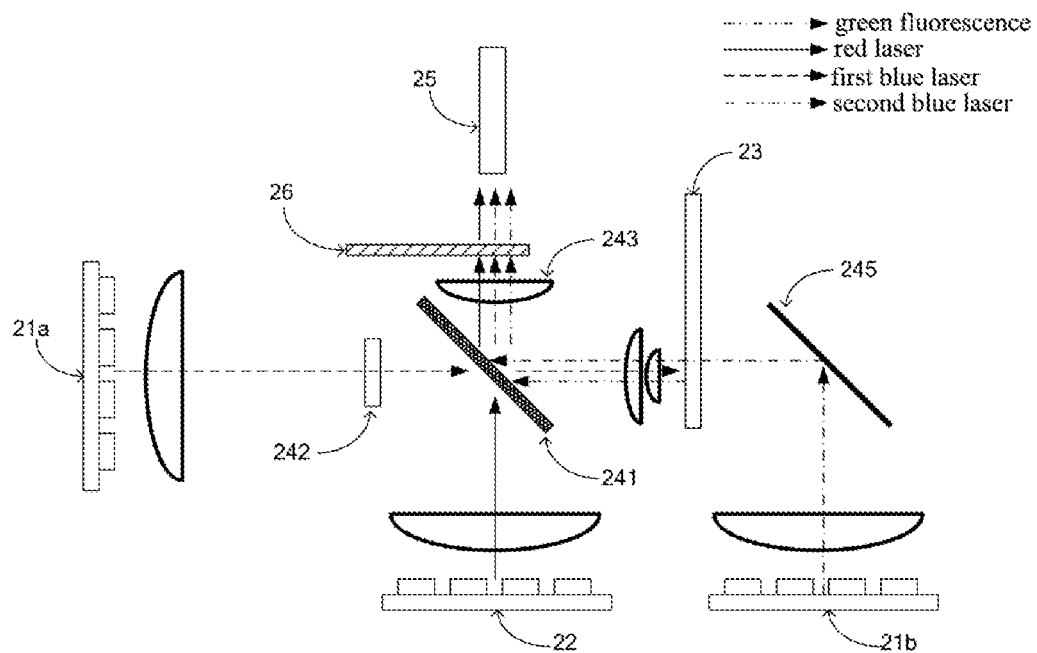
FIG. 7B is a structural diagram for yet another dual-color laser light source provided by an embodiment of the present application.

In some implementations, as shown in FIG. 7B, the light combining component includes a first dichroic sheet 241 which is arranged on a light incident side of the light collecting component 25;

The first dichroic sheet 241 is used to transmit the red laser and the first blue laser, and to reflect the green fluorescence and the second blue laser.

In some implementations, as shown in FIG. 7B, the laser light source also includes a second dichroic sheet 245. The fluorescent wheel 23 is positioned between the second dichroic sheet and the light combining component 24. The light emergent direction of the second blue laser transmitter 21b is perpendicular to the axial direction of the fluorescent wheel 23. The second dichroic sheet 245 is used to reflect the second blue laser onto the fluorescent wheel. In some other implementations, the second blue laser transmitter 21b may directly face towards the fluorescent wheel, hence there is no need to arrange the dichroic sheet 245.

In some implementations, as shown in FIG. 3A, the fluorescent wheel may include a green fluorescent region Y and a transmission region K. The surface of the green fluorescent region Y is provided with green fluorescent powder. The surface of the transmission region Y is provided with a first diffuser. Both the green fluorescent region and the transmission region are in a fan-shaped arrangement. During rotation, the fluorescent wheel is able to emit the green fluorescence and to transmit the second blue laser in sequence.

In this application, the fluorescent wheel may rotate at a preset rotation speed. When the first blue laser transmitter is turned on, the green fluorescent region of the fluorescent wheel is aligned with a fifth light beam shaping device E (the green fluorescent region is an irradiated region of the laser). Both the second blue laser transmitter and the red laser transmitter are not turned on. When the second blue laser transmitter is turned on, the transmission region of the fluorescent wheel is aligned with the fifth light beam shaping device E (the transmission region is an irradiated region of the laser), and both the first blue laser transmitter and the second blue laser transmitter are not turned on. When both the first blue laser transmitter and the red laser transmitter are not turned on; when both the first blue laser transmitter and the second blue laser transmitter are not turned on, the red laser transmitter is turned on.

Since the central area of the fluorescent wheel is unable to be aligned with the fifth light beam shaping device, i.e., the central area of the fluorescent wheel is unable to serve as an irradiated region of the laser at any moment, hence as shown in FIG. 3B, the fluorescent wheel may also include a blank area Q which is positioned in the central area of the fluorescent wheel. The green fluorescent region Y is positioned on the periphery of the blank area Q, wherein the green fluorescent region Y is in a fan-shaped circular arrangement, and the transmission region K is in a fan-shaped or a fan-shaped circular arrangement.

The realization principle and technical effect in this embodiment are similar to those in the aforementioned embodiment, and will not be repeated herein.

Figure 8:
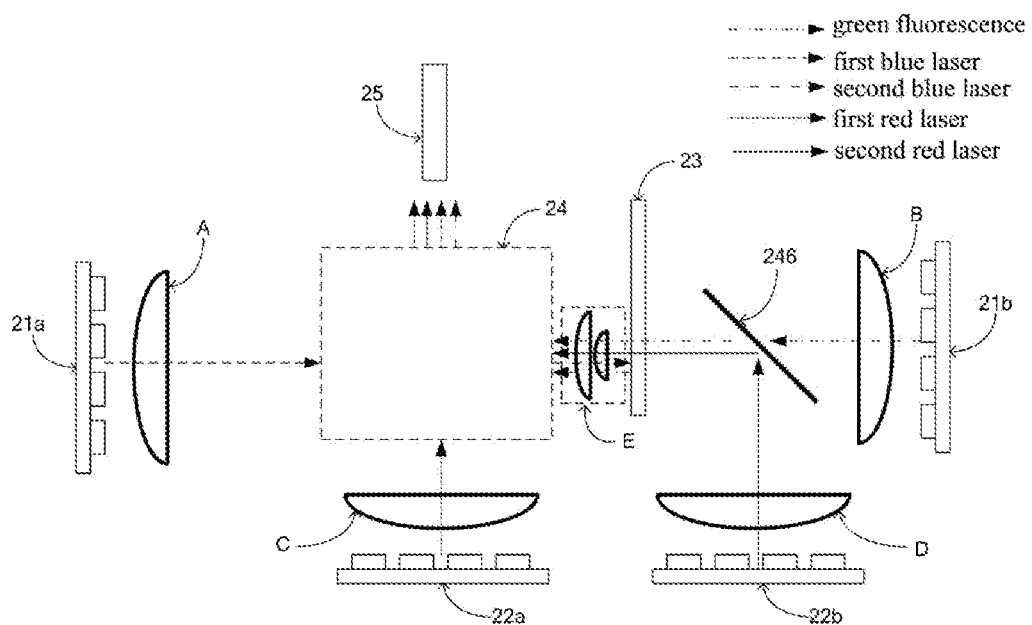
FIG. 8 is a structural diagram for yet another dual-color laser light source provided by an embodiment of the present application.

In some implementations, as shown in FIG. 8, the laser light source at least includes:

a first blue laser transmitter 21a, a second blue laser transmitter 21b, a first red laser transmitter 22a and a second red laser transmitter 22b, a fluorescent wheel 23, a light collecting component 25 and a light combining component 24, wherein the fluorescent wheel is provided with a green fluorescent region and a transmission region.

The light combining component 24 is arranged between the first blue laser transmitter 21a and the fluorescent wheel 23, wherein the fluorescent wheel 23 is arranged between the light combining component 24 and the second blue laser transmitter 21b. The light collecting component 25 and the first red laser transmitter 22 are arranged on both sides of the light combining component 24, respectively, a connection line between the first blue laser transmitter 21a and the fluorescent wheel 23 is perpendicular to a connection line between the light collecting component 25 and the first red laser transmitter 22a.

The second red laser transmitter 22b and the second blue laser transmitter 21b are arranged on the same side of the fluorescent wheel 23.

The light combining component 24 is used to transmit first blue laser emitted by the first blue laser transmitter 21a to the fluorescent wheel 23, and to reflect the green fluorescence onto the light collecting component 25 after receiving the green fluorescence generated by the first blue laser irradiating the green fluorescent region.

The light combining component 24 is also used to receive first red laser emitted by the first red laser transmitter 22a and to transmit the first red laser to the light collecting component 25.

The light combining component 24 is also used to reflect the second red laser which is emitted by the second red laser transmitter 22b and transmitted through the transmission region to the light collecting component 25.

The light combining component is also used to receive first red laser emitted by the first red laser transmitter 22a and to transmit the first red laser to the light collecting component 25.

A polarization direction of the first red laser is perpendicular to a polarization direction of the second red laser.

In some implementations, the light collecting component may be a light-pipe.

It is illustrated that the laser transmitter provided by the embodiment of the present application may be an array of laser transmitters.

As shown in FIG. 8, the first blue laser transmitter 21a, the first red laser transmitter 22a, the light combining component 24 and the light collecting component 25 are arranged on a first side of the fluorescent wheel 23. The second blue laser transmitter 21b and the second red laser transmitter 22b are arranged on a second side of the fluorescent wheel 23. The light combining component 24 is arranged between the first blue laser transmitter 21a and the fluorescent wheel 23, and the light combining component 24 is arranged between the first red laser transmitter 22a and the light collecting component 25.

Correspondingly, a polarization direction of the second blue laser is perpendicular to a polarization direction of the first blue laser, and the polarization direction of the second blue laser is parallel with the polarization direction of the second red laser. The light combining component 24 is used to transmit the first blue laser and the first red laser, and to reflect the second blue laser and the second red laser.

In some implementations, as shown in FIG. 8, in the dual-color laser light source provided by the embodiment of the present application, the side on the light emergent surface of each of the laser transmitters may be provided with a light beam shaping device, which are a first light beam shaping device A, a second light beam shaping device B, a third light beam shaping device C and a fourth light beam shaping device D, respectively. The light beam shaping device may be a telescopic system (in practical applications, the telescopic system may include one convex lens and one concave lens), for condensing the parallel laser emitted by the laser transmitters, so as to reduce the area of the beam, and the condensed laser is still parallel laser, which may improve transmittance of the parallel laser in a back end optical device.

In some implementations, as shown in FIG. 8, a fifth light beam shaping device E may be provided between the light combining component 24 and the fluorescent wheel 23, wherein the fifth light beam shaping device E may be composed of two lens. The first blue laser emitted by the first blue laser transmitter is focused by the two lens before irradiating the fluorescent wheel. The green fluorescence emitted by the fluorescent wheel may be performed collimation by the two lens before entering the light combining component, improving uniformity of the emergent light. The fifth light beam shaping device E is also used to perform collimation to the second blue laser and the second red laser. In some implementations, the fifth light beam shaping device E may also be composed of one, three or four lenses, and there will be no restrictions on the number of the lenses composing the light beam shaping device in the embodiment of the present application.

Figure 9A:
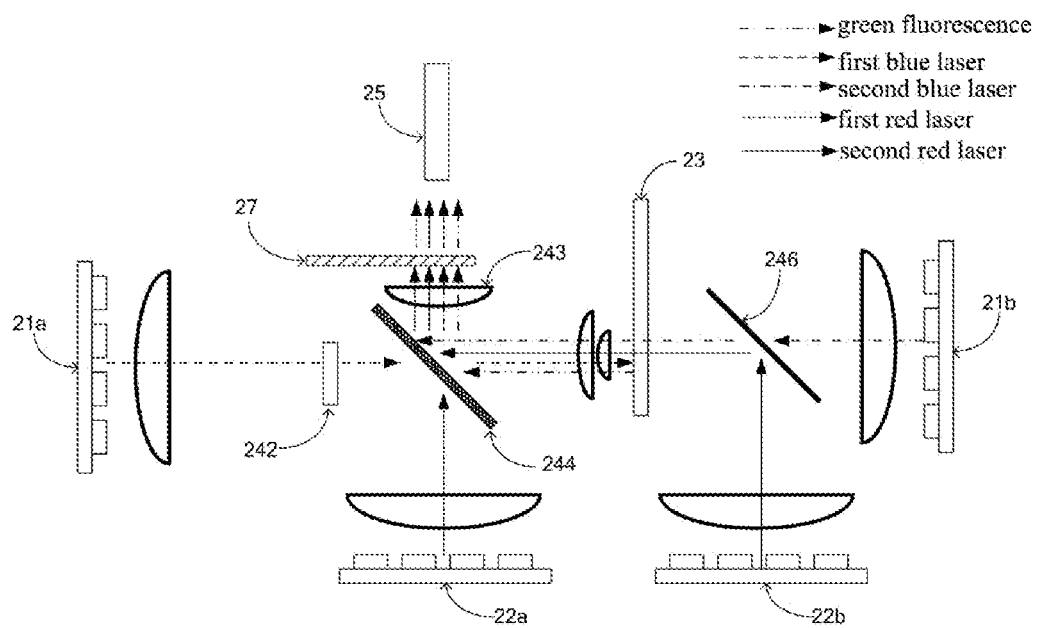
FIG. 9A is a structural diagram for yet another dual-color laser light source provided by an embodiment of the present application.
Figure 9B:
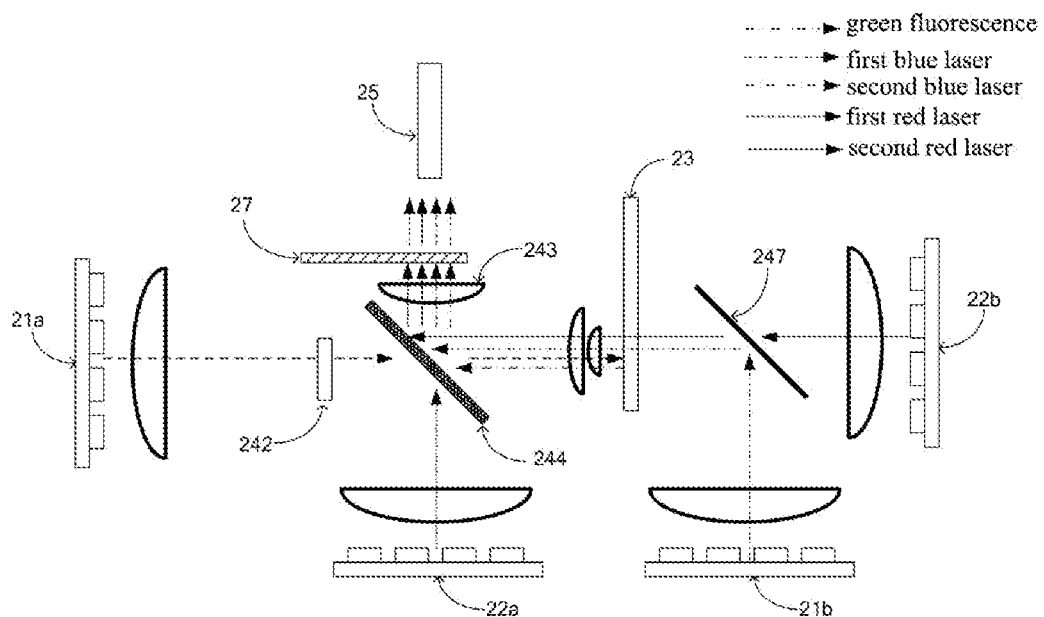
FIG. 9B is a structural diagram for yet another dual-color laser light source provided by an embodiment of the present application.

Because a direction of the second blue laser emitted by the second blue laser transmitter 21b is perpendicular to a direction of the second red laser emitted by the second red laser transmitter 22b. Then as shown in FIG. 8 and FIG. 9A, the dual-color laser light source may also include: a third dichroic sheet 246 which is positioned between the second blue laser transmitter 21b and the fluorescent wheel 23, wherein the third dichroic sheet 246 may be used to transmit the second blue laser to the fluorescent wheel, and to reflect the second red laser onto the fluorescent wheel. At present, the first blue laser transmitter and the second blue laser transmitter are arranged on both side of the fluorescent wheel opposite to each other. In some implementations, as shown in FIG. 9B, the dual-color laser light source may also include: a fourth dichroic sheet 247 which is positioned between the second red laser transmitter 22b and the fluorescent wheel 23. The fourth dichroic sheet may be used to transmit the second red laser to the fluorescent wheel, and to reflect the second blue laser onto the fluorescent wheel.

In the embodiment of the present application, the third dichroic sheet 246 may be positioned to form an included angle of 45° with the second red laser transmitter 22b, so that after being reflected by the third dichroic sheet, the second red laser emitted by a horizontally positioned second red laser transmitter may enter the fluorescent wheel in a perpendicular way, thereby enabling the second red laser to be emitted in a preset light path, thus ensuring stability in laser emission. In some implementations, the fourth dichroic sheet 247 may be positioned to form an included angle of 45° with the second blue laser transmitter 21b, so that after being reflected by the fourth dichroic sheet, the second blue laser emitted by a horizontally positioned second blue laser transmitter may enter the fluorescent wheel in a perpendicular way, thereby enabling the second blue laser to be emitted in a preset light path, thus ensuring stability in laser emission.

The light path emission process of the dual-color laser light source as shown in FIG. 8 and FIG. 9A includes: after passing through the first light beam shaping device A, the first blue laser emitted by the first blue laser transmitter 21a transmits through the light combining component 24, and then passes through the fifth light beam shaping device E and irradiates onto the fluorescent wheel 23, thereby exciting the green fluorescent powder to emit green fluorescence, wherein the green fluorescence passes through the fifth light beam shaping device E and is then reflected by the light combining component 24 to be outputted. The second blue laser emitted by the second blue laser transmitter 21b passes through the second light beam shaping device B, and then transmits through the third dichroic sheet 246 onto the fluorescent wheel 23, and after transmitting through the fluorescent wheel 23, the second blue laser passes through the fifth light beam shaping device E and is reflected by the light combining component 24 to be outputted. After passing through the third light beam shaping device C, the first red laser emitted by the first red laser transmitter 22a transmits through the light combining component 24 to be outputted, and after passing through the fourth light beam shaping device D, the second red laser emitted by the second red laser transmitter 22b is reflected by the third dichroic sheet 246 onto the fluorescent wheel 23, wherein the second red laser transmits through the fluorescent wheel 23, then passes through the fifth light beam shaping device E and is then reflected by the light combining component 24 to be outputted. A converted light of the first red laser and the second red laser is the red laser finally outputted from the light combining component 24. Three lights with different colors enter the light collecting component 25 and may be blended to form white light, thereby fulfilling the lighting function of the dual-color laser light source.

In summary, in the dual-color laser light source provided by the embodiment of the present application, since the red laser collected by the light combining component is converted light of the first red laser and the second red laser with polarization directions perpendicular to each other, overlay of the two polarized light is able to form overlay of phase patterns during image projection, so as to generate more independent random phase patterns, thereby efficiently reducing speckle effects of the red laser while improving the optical quality of the dual-color laser light source.

In the embodiments of the present application, the first blue laser transmitter, the second blue laser transmitter, the first red laser transmitter and the second red laser transmitter are each turned on in sequence. Or the first blue laser transmitter, the second blue laser transmitter and the red laser transmitter are each turned on in sequence, wherein the first red laser transmitter and the second red laser transmitter of the red laser transmitter are turned on at the same moment. As shown in FIG. 9A and FIG. 9B, the light combining component may include a polarization-combining dichroic sheet 244 which is arranged on the light incident side of the light collecting component 25, and is used to transmit the first blue laser and the first red laser, and to reflect the green fluorescence, the second blue laser as well as the second red laser.

In some implementations, the first red laser is p polarized light. The second red laser is s polarized light. The first blue laser is p polarized light. And the second blue laser is s polarized light. Correspondingly, the arranged polarization-combining dichroic sheet may transmit the p polarized light, and reflect the s polarized light.

Alternatively, the first red laser is s polarized light. The second red laser is p polarized light. The first blue laser is s polarized light. And the second blue laser is p polarized light. Correspondingly, the arranged polarization-combining dichroic sheet may transmit the s polarized light, and reflect the p polarized light.

It is noted that the polarization-combining dichroic sheet may also reflect the green fluorescence.

In some implementations, as shown in FIG. 9A and FIG. 9B, the laser light source may also include a color filter wheel 27 which is arranged between the polarization-combining dichroic sheet 244 (the light combining component) and the light incident side of the light collecting component 25. As shown in FIG. 5, the color filter wheel may include a red light filter region R, a blue light filter region B and a green light filter region G. During rotation the color filter wheel is able to transmit the second blue laser, red laser and the green fluorescence in sequence.

In some implementations, during rotation of the color filter wheel, when the irradiated region of the color filter wheel is the blue light filter region, the second blue laser transmitter is turned on, while the first blue laser transmitter, the first red laser transmitter and the second red laser transmitter are not turned on; when the irradiated region of the color filter wheel is the red light filter region, the first red laser transmitter and the second red laser transmitter are turned on, while both the first blue laser transmitter and the second blue laser transmitter are not turned on; when the irradiated region of the color filter wheel is the green light filter region, the first blue laser transmitter is turned on while the second blue laser transmitter, the first red laser transmitter and the second red laser transmitter are not turned on, so as to transmit the second blue laser, the red laser and the green fluorescence in sequence.

In the embodiment of the present application, in order to enhance the speckle removal effect, preferably, a region capable of transmitting the red light on the color filter wheel is but not limited to the red light filter region.

In some implementations, as shown in FIG. 9A and FIG. 9B, the laser light source may also include a fixed diffusion sheet 242 for homogenizing blue laser emitted by the first blue laser transmitter. And because the blue laser emitted by the first blue laser transmitter is excited light of the fluorescent wheel. If the beam is not homogenized, the light spot of laser will have uneven intensity distribution and concentrated energy. Hence when directly entering the fluorescent wheel surface, the energy-concentrated laser spot is likely to burn the surface of the fluorescent wheel and damage the fluorescent wheel, causing the laser unable to normally excite the fluorescent wheel to emit the fluorescence.

In some other implementations, as shown in FIG. 9A and FIG. 9B, the laser light source may also include a focusing lens 243 which is arranged between the polarization-combining dichroic sheet 244 and the color filter wheel 27. Because when the beam diffusion angle of the light transmitted through or reflected by the polarization-combining dichroic sheet is larger than the collection angle of the light collecting component, hence the light collection efficiency is reduced, and the brightness of the projection light source is influenced. The focusing lens may be used to respectively focus the first red laser transmitted through the polarization-combining dichroic sheet, and the green fluorescence, the second blue laser, and the second red laser reflected by the polarization-combining dichroic sheet, improving the light collection efficiency by the light collecting component, so as to improve the brightness of the projection light source.

In some implementations, in the color filter wheel provided by the embodiment of the present application, the surface of the red light filter region may be provided with a second diffuser, and the surface of the blue light filter region may be provided with a third diffuser. The second diffuser and the third diffuser may be micron-level particles.

Figure 10:
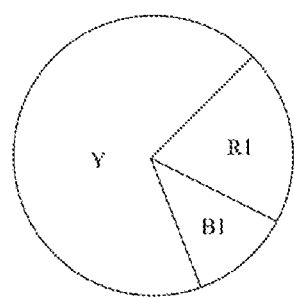
FIG. 10 is a diagram for another fluorescent wheel provided by an embodiment of the present application.

As shown in FIG. 10, the fluorescent wheel may include a green fluorescent region Y and a transmission region, wherein the transmission region may include a red light diffusion region R1 and a blue light diffusion region B1. The surface of the green fluorescent region Y is provided with green fluorescent powder. The surfaces of the red light diffusion region R1 and the blue light diffusion region B1 are respectively provided with a first diffuser which is micron-level particles. During rotation, the fluorescent wheel is able to emit the green fluorescence, to transmit the second blue laser and the second red laser in sequence.

In the embodiment of the present application, in order to enhance the speckle removal effect, preferably, a region capable of transmitting the red light through the transmission region of the fluorescent wheel is the red light diffusion region. The region capable of transmitting the blue light is the blue light diffusion region. The above descriptions are not indented to make limitations.

It is noted that the particle diameter of the diffuser arranged on the surface of the fluorescent wheel is different from particle diameter of the diffuser arranged on the surface of the color filter wheel.

Strong coherence of the laser inevitably results in speckle effects. The so-called speckles refer to the phenomenon that, when a coherent light source irradiates a rough object, because the diverged light has equal wavelength and a constant phase, an interference may be created in space, where partly being constructive interference and partly being destructive interference. The final result is that granulate light and dark spots on a screen is occurred, i.e., some unfocused smudging, which is likely to develop a sense of dizziness after long-time watching, which inevitably brings about quality deterioration of projected images, reducing the viewing experience of users.

In the embodiment of the present application, when passing through the fluorescent wheel, the second blue laser emitted by the second blue laser transmitter is firstly subjected to first diffusion by the first diffuser on the blue light diffusion region of the fluorescent wheel. Then after entering the light combining component, the second blue laser is subjected to subjected to second diffusion by the third diffuser on the blue light filter region of the color filter wheel. Because the particle diameter of the first diffuser on the blue light diffusion region of the fluorescent wheel is different from the particle diameter of the third diffuser on the blue light filter region of the color filter wheel, hence a diffusion angles for the second blue laser is different, which may cause the second blue laser to generate more independent random phase patterns. In some implementations, since both the fluorescent wheel and the color filter wheel conduct rotation, the moving diffuser may further increase the random phases, which may be better able to destroy the coherence of the blue laser, allowing the laser light source for projection to form more independent random phase patterns on a projected image. Likewise, a principle of speckle removal of the second red laser may follow a principle referring to that of the second blue laser, and will not be repeated herein. The more the number of the independent random phase patterns, the weaker the phenomenon of the light and dark spots under an integral function of human eye, so as to efficiently reduce the speckle effects of the laser, and to improve optical quality of a dual-color laser light source.

In some implementations, a particle diameter of the diffuser arranged on the surface of the fluorescent wheel may be greater than a particle diameter of the diffuser arranged on the surface of the color filter wheel, for example, the particle diameter of the diffuser arranged on the surface of the fluorescent wheel is 100 microns, and the particle diameter of the diffuser arranged on the surface of the color filter wheel is 30 microns. Firstly, the diffuser arranged on the surface of the fluorescent wheel may scatter the laser, then the diffuser arranged on the surface of the color filter wheel accurately rearrange the phases of the laser.

It is noted that the particle diameter of the diffuser arranged on the surface of the fluorescent wheel may also be smaller than the particle diameter of the diffuser arranged on the surface of the color filter wheel, for example, the particle diameter of the diffuser arranged on the surface of the fluorescent wheel is 30 microns, and the particle diameter of the diffuser arranged on the surface of the color filter wheel is 100 microns.

In further demonstration, in comparison with the blue laser, the red laser has a longer coherence length, and thus higher coherence, therefore, a speckle phenomenon is severer. Whereas in the dual-color laser light source provided by the embodiment of the present application, the red laser is a converted light of the first red laser and the second red laser. Because the first red laser and the second red laser are different polarized light, for example, the first red laser is p polarized light and the second red laser is s polarized light. During image projection, overlay of the two polarized light is able to form overlay of phase patterns, so as to generate more independent random phase patterns, further weakening speckle effects of the red laser.

In summary, in the dual-color laser light source provided by the embodiment of the present application, because the red laser collected by the light combining component is the converted light of the first red laser and the second red laser with polarization directions perpendicular to each other. Overlay of the two polarized light is able to form overlay of phase patterns during image projection, so as to generate more independent random phase patterns, which efficiently weaken the speckle effects of the red laser while improve the optical quality of the dual-color laser light source.

An embodiment of the present application provides a laser projector, which may include the dual-color laser light source as shown in any of FIG. 2A, FIG. 2B, FIG. 4, and FIG. 6 to FIG. 9B.

The aforementioned descriptions are just optional embodiments of the present application, and are not intended to restrict the present application. All the changes, equivalent replacement as well as modifications made within the spirit and principle of the present application shall fall into the protection scope of the present application.

What is claimed is:

1. A dual-color laser light projection device, comprising a first blue laser transmitter configured to emit a first blue laser, a second blue laser transmitter configured to emit a second blue laser, a red laser transmitter configured to emit a red laser, a light combining component, a fluorescent wheel, a light-pipe; wherein the fluorescent wheel comprises a green fluorescent region provided with a green fluorescent powder and a transmission region, and wherein the green fluorescent region is configured to be excited by the first blue laser to generates green fluorescence;
   the light combining component is disposed on a light path between the first blue laser transmitter and the fluorescent wheel, a light path between the light-pipe and the second blue laser transmitter and a light path between the light-pipe and the red laser transmitter;
   the light combining component is configured to receive the first blue laser, and to emit the first blue laser to the fluorescent wheel;
   the light combining component is also configured to receive the green fluorescence, the second blue laser and the red laser, and to emit the green fluorescence, the second blue laser and the red laser to the light-pipe.

2. The laser light source according to claim 1, wherein, the first blue laser is incident to the light combining component along a first direction, and is emitted to the fluorescent wheel along a second direction; the green fluorescence, the second blue laser and the red laser are emitted to the light-pipe along a third direction.

3. The laser light source according to claim 2, wherein, the first direction is substantially same with the second direction.

4. The laser light source according to claim 3, wherein, the first blue laser transmitter and the fluorescent wheel are oppositely disposed on two sides of the light combining component.

5. The laser light source according to claim 3, wherein, the first direction is substantially perpendicular to the third direction.

6. The laser light source according to claim 3, wherein, the fluorescent wheel is disposed on a light path between the light combining component and the red laser transmitter, the fluorescent wheel is provided with the transmission region; the red laser transmitted from the transmission region is incident to the light combining component along a fourth direction, and the green fluorescence is incident to the light combining component along the fourth direction.

7. The laser light source according to claim 2, wherein, the second blue laser of the second blue laser transmitter is incident to the light combining component along a direction substantially same with a third direction, and the light combining component is configured to emit the second blue laser to the light-pipe along the third direction.

8. The laser light source according to claim 2, wherein, the red laser of the red laser transmitter is incident to the light combining component along a direction substantially same with the third direction, and the light combining component is configured to emit the red laser to the light-pipe along the third direction.

9. The laser light source according to claim 2, wherein, the fluorescent wheel is disposed on a light path between the light combining component and the red laser transmitter and is disposed on an light path between the light combining component and the second blue laser transmitter, the red laser transmitted from the transmission region and the second blue laser transmitted by the transmission region are incident to the light combining component along a fourth direction, and the green fluorescence is incident to the light combining component along the fourth direction.

10. The laser light source according to claim 1, wherein, a direction where the green fluorescence is emitted from the fluorescent wheel to the light combining component is substantially opposite to the direction where the first blue laser is emitted from the light combining component to the fluorescent wheel.

11. The laser light source according to claim 1, wherein, the first blue laser transmitter is disposed in a fifth direction from the light combining component, the fluorescent wheel is disposed in a sixth direction from the light combining component, the light-pipe is disposed in a seventh direction from the light combining component, and the second blue laser transmitter is disposed in a eighth direction from the light combining component; the fluorescent wheel is disposed on a light path between the red laser transmitter and the light combining component, and the red laser is emitted from the transmission region to be incident to the light combining component, wherein the fifth direction, the sixth direction, the seventh direction, and the eighth direction are different.

12. The laser light source according to claim 11, wherein, the first blue laser transmitter and the fluorescent wheel are oppositely disposed on two sides of the light combining component, the light combining component is configured to transmit the first blue laser and reflect the green fluorescence, and the fifth direction is parallel to the sixth direction, but a direction of the fifth direction is opposite to a direction of the sixth direction.

13. The laser light source according to claim 12, wherein, the light-pipe and the second blue laser transmitter are oppositely disposed on two sides of the light combining component, the light combining component is configured to transmit the second blue laser, and the seventh direction is parallel to the eighth direction, but a direction of the seventh direction is opposite to a direction of the eighth direction.

14. The laser light source according to claim 1, wherein, the first blue laser transmitter is disposed in a fifth direction from the light combining component, the fluorescent wheel is disposed in a sixth direction from the light combining component, the light-pipe is disposed in a seventh direction from the light combining component; the fluorescent wheel is disposed on an light path between the red laser transmitter and the light combining component and is disposed on an light path between the second blue laser transmitter and the light combining component, and the transmission region is configured to transmit the red laser, wherein the red laser emitted from the transmission region is incident to the light combining component, and the transmission region is configured to transmit the second blue laser, wherein the second blue laser transmitted from the transmission region is incident to the light combining component, wherein the fifth direction, the sixth direction and the seventh direction are different.

15. The laser light source according to claim 1, wherein, the first blue laser transmitter is disposed in a fifth direction of the light combining component, the fluorescent wheel is disposed in a sixth direction of the light combining component, the light-pipe is disposed in a seventh direction of the light combining component, the second blue laser transmitter and the red laser transmitter are disposed in a eighth direction of the light combining component, wherein the fifth direction, the sixth direction, the seventh direction and the eighth direction are different.

* * * * *